The U.S. patent application Serial No. 125,273, now Patent No. 3,208,594, filed on July 19, 1961, describes an oscillating sifting screen comprising two relatively movable systems of bars which alternately interengage in pairs, adjacent bars of different systems being connected by crosspieces to which they are pivotally or movably joined, and which divide the spaces between the bars into an open mesh of suitable length to permit the two systems of bars to perform said relative movements.

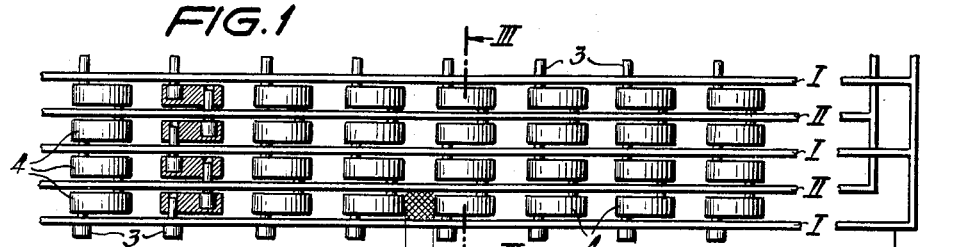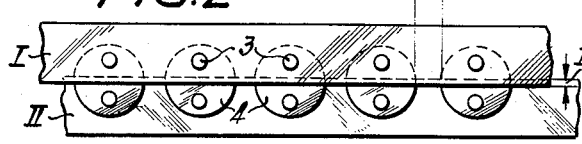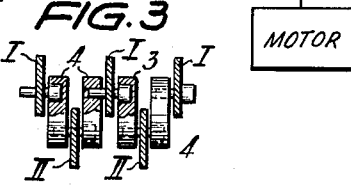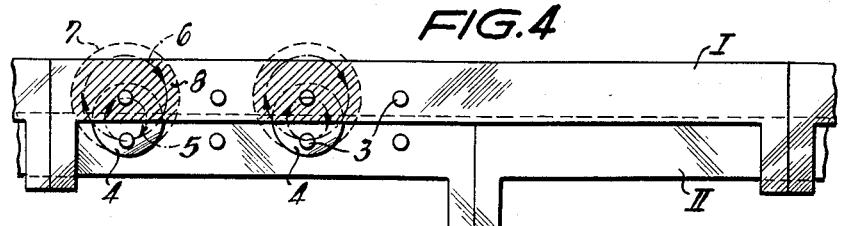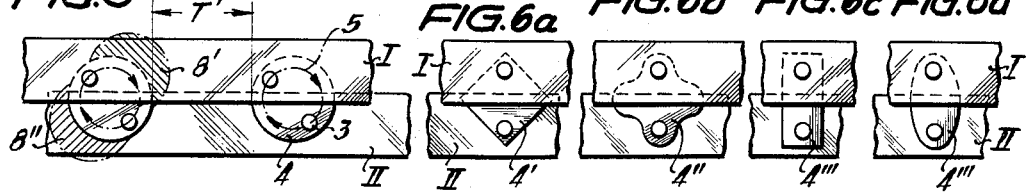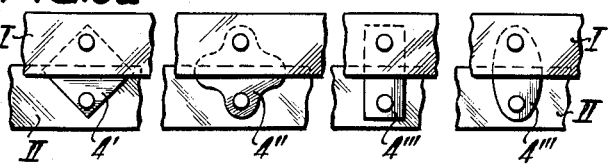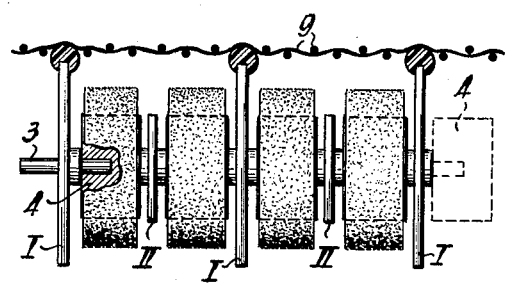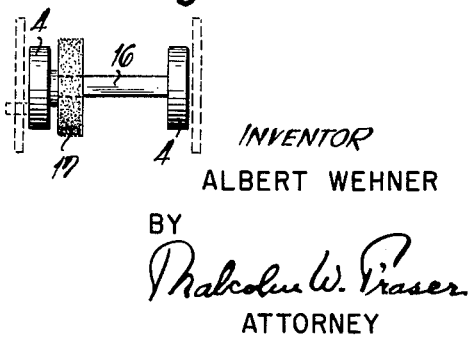

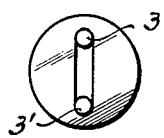 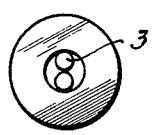 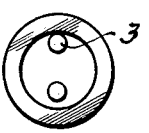 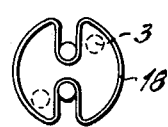
FIG.9a   FIG.9b   FIG.9c   FIG.9d
   
FIG.9e   FIG.9f   FIG.9g   FIG.9h
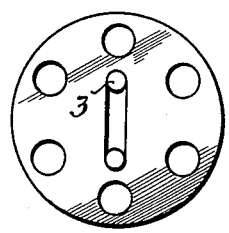 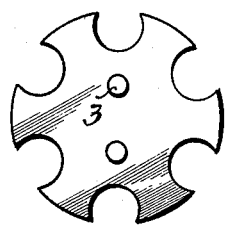
FIG.10   FIG.11
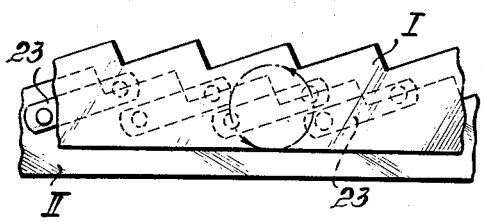 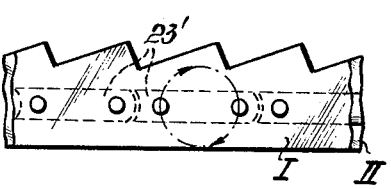
FIG.12a   FIG.12b
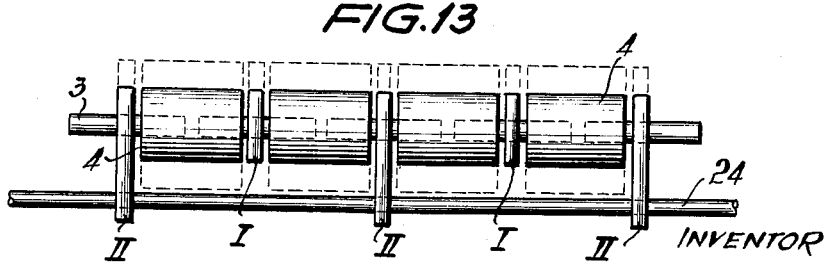
FIG.13
INVENTOR
ALBERT WEHNER
BY
*Malcolm W. Fraser*
ATTORNEY 3,254,767
RELATIVELY MOVABLE BAR SCREEN
WITH CLEANERS
Albert Wehner, 70 Grunring, Herne,
Westphalia, Germany
Filed Apr. 10, 1962, Ser. No. 186,560
Claims priority, application Germany, Apr. 12, 1961,
W 29,786
9 Claims. (Cl. 209—329)

The advantage of a screen constructed in the specified way is that it is completely immune against choking and that its classifying performance and its screening capacity are both very high because of the relative motion of the crosspieces.

Such a screen therefore combines the advantages of a mesh screen with those of a screen belonging to the class of gap screen or grizzlies.

The present invention is based on the principles described in the parent patent and concerns an oscillating sifting screen which has an even better self-cleaning effect than the screen described in the parent patent, though the feed may be of a particularly difficult nature and have a tendency to form accumulations of ultrafine material on the bars, and which also has the advantage of permitting the length of the mesh between the relatively movable bars (which, in the screen claimed in the parent patent, constantly varies) to remain constant. More particularly, the invention permits the principle described in the above identified patent to be used for screening especially hard abrasive materials, such as hard ores, coke and the like.

The invention is a development of the special embodiment of a sifting screen described in the above identified patent in which the crosspieces which are movably connected with bars are themselves rigid structural members.

The idea which underlies the present invention is that these rigid crosspieces are eccentrically and rotatably mounted on each of the two adjacent bars and extend perpendicularly across the entire gap separating the bars.

In principle, the crosspieces are barrel-shaped or cylindrical bodies which bear closely against the sides of the bars with their conformably shaped end faces whereas their thickness corresponds with the width of the gap between neighbouring bars of different systems. The crosspieces are connected to the two bars at eccentrically opposite points of their section to form a horizontal row of pivots which remain horizontally aligned whilst the crosspieces rotate. The rotation imparted by drive means to both bar systems may be either continuous or reciprocatory.

In view of the said disposition of the crosspieces on the bars of the two systems which they interconnect, the crosspieces will merely rotate about their central axes but remain otherwise stationary if the two systems of bars move. On the other hand, if only one of the bar systems moves, then the central axes of the crosspieces will rotate in a circle about a center on the stationary bar with a radius equal to the distance between the two pivots.

The end faces of the cylindrical crosspieces sweep out partial circular areas on the sides of the cooperating bars.

In an embodiment of the invention which is preferred for its perfect self-cleaning effect, the crosspieces are spaced along the length of the bars at intervals chosen by reference to their diameter and the distance between their pivots on the two cooperating bars so that the areas swept by the crosspieces on each of the bars at least touch and preferably overlap. The lengths of the rectangular mesh defined by the spacing of the crosspieces between adjacent bars remain constant during the relative movement of the two bars.

In an alternative form of construction of the invention the crosspieces need not be cylindrical or barrel-shaped and they may have a section which deviates from a circular section, for instance an elliptic or prismatic section. Moreover, their peripheries may be provided with equidistantly spaced recesses or the like. However, in such a case the length of the mesh between longitudinally consecutive crosspieces will then naturally cease to be constant.

In order to increase the open area of the screen, if this is desired, the roller-shaped or cylindrical crosspieces may be formed with a centrally constricted cross section forming a waist like a diabolo shuttle, especially if the bars are more widely spaced.

The above described basic construction of the proposed screen can be modified and varied in a considerable number of ways and thus be adapted to the solution of a wide diversity of screening problems. For instance, the diameters and relative spacing of the crosspiece pivots may be such that the partial circular areas swept by the crosspieces on the side of the bars are completely submerged below the upper edge of the bars or intersect them. However, a more convenient arrangement is generally one in which the paths of the crosspieces rise beyond the upper edge of the bars because additional screening as well as conveying effects can thus be achieved, especially if in a manner already known to the art the upper edges of the bars, and possibly also the crosspieces, are provided with serrations or like indentations which assist in conveying the feed.

The circular gyrating motion of the crosspieces may be supplemented by a further superposed movement by providing elongated instead of round holes in the crosspieces for the reception of the pivot pins projecting from the adjacent bars. As such, the crosspieces may consist of any rigid material, for instance, instead of consisting of metal they may be made of some ceramic material or glass, or also of some semi-elastic material, such as the plastic sold on the market under the trade name "Vulcollan." Moreover, the surfaces which are in contact with the sides of the bars may be provided with lips or the like to assist the self-cleaning effect and, with a view to reducing wear, the holes in the bars for the reception of the pivot pins may be blind holes and their open ends may be closed by suitable sealing means.

In a special embodiment of the proposed self-cleaning screen, especially in a form of construction in which the paths of the crosspieces rise above the upper edge of the bars, the latter may be provided with openings or holes permitting material on the screen to pass through said openings in the axial direction of the crosspieces and thus to be conveyed through the screen. In such an arrangement the rotating crosspieces should rotate into positions in which they clear the underside of the bars.

Very conveniently the crosspieces may be compound elements, comprising a core made of a bearing metal or like material and a ring-shaped member of non-abrasive material surrounding the core. Wear by abrasion can be even further reduced if the ring-shaped member is mounted on the core like a loose roller adapted to rotate on the core.

In a particularly useful modification of the invention the ring-shaped members may be directly and loosely placed over the pivot pins with freedom to perform movements of their own. In such an arrangement it is preferred that the open cross section of these rings, especially when this rises above the upper plane of the screen, should be additionally utilised to promote the classifying screening action. Grain can then enter the ring in its upper position and leave it when the ring is in its bottom position. The open area of the proposed screen is thus effectively greatly increased. Especially if, as is within the scope of the possibilities afforded by the invention, the proposed screen is driven at a higher speed, for instance in the order of 800 r.p.m., then the play between the ring and the core might be arranged to be even greater, so that centrifugal forces will give rise to relative movements between core and ring for the generation of additional effects, quite apart from imparting to the mesh defined by the distance between consecutive rings a possibly desirable degree of yielding flexibility.

One of the numerous and particularly advantageous applications of the principle of the invention is that of sifting an ultrafine material, such as flour. In such a case the arrangement of the two bar systems is such, that the edges of the bars of one system remain above the upper edges of the bars of the other system in every phase of the oscillating motion, and the surface formed by the totality of the upper edges of the said first system is then covered by a fine mesh screen fabric which is continuously cleaned by brushes provided on the peripheries of the crosspieces to sweep the underside of the fabric and to assist the screening action.

The disposition and arrangement of the crosspieces may also be such that in their extreme positions consecutive crosspieces overlap and seal the mesh, one of the bar systems in this arrangement being preferably stationary.

A screen thus contrived can therefore be used like a valve which periodically opens and shuts, for use for instance in a jigging machine.

Furthermore, in order to provide for the continuous automatic cleaning of the peripheries of the cylindrical crosspieces, wires, cords and the like may be suspended between consecutive bars of the same system, said wires and the like continuously scraping the periphery of the rotating crosspieces.

Naturally it is by no means essential that the crosspieces should be of solid construction. For the purpose of saving material and weight they may be provided with additional holes other than the holes required as bearings for the pivot pins, which are "through" holes when the bar spacing is close, though usually they will be blind holes.

The accompanying drawings schematically illustrate a few of the many practical embodiments of a screen based on the principles which have been described above. In the drawings:

FIG. 1 is a plan of part of a screen surface, details which are irrelevant to the invention being omitted, FIG. 2 is a side view of two bar elements of the screen surface of FIG. 1 in extreme relative positions, FIG. 3 is a section taken on the line III—III of FIG. 1, FIG. 4 illustrates the motions of the crosspieces in a side view corresponding to FIG. 2, by showing one phase of said motion, FIG. 5 shows another phase of the motion of the crosspieces, FIGS. 6a–6d illustrate various embodiments of crosspieces, on a larger scale, FIG. 7 is a side view similar to FIG. 3 of an embodiment of a screen structure for sifting a very fine material such as flour, FIGS. 8a–8g illustrate modifications of the crosspieces in the form of compound members, FIGS. 9a–9h illustrate modifications of construction of the crosspieces in the form of ring-shaped members which have a supplementary classifying effect, FIGS. 10 and 11 show further embodiments of disc-shaped crosspieces, FIGS. 12a–12b are schematic representations, similar to that of FIG. 1, of a screen according to the invention, with a valve effect, and FIG. 13 is a side view supplementary cleaning device for cleaning the peripheries of cylindrical crosspieces.

FIG. 1 shows the two systems of relatively interposed bars, the bars forming one of the systems being marked I and the bars of the system being marked II. Each bar of one system is connected to the two neighboring bars belonging to the other system by crosspieces which in the illustrated embodiment have the form of discs 4 of a thickness roughly corresponding to the width of the gaps between neighboring bars determined by the relative spacing of the bars of the two systems I and II. Each of the discs 4 is rotatably connected with one of the neighboring bars by a pivot pin 3 which is fitted into an eccentric hole in the disc and rotatably passes through a hole in the bar, the head of the pin 3 on the other side of the bar being rotatable in a recess in the adjacently transversely aligned disc 4 located at a point symmetrically corresponding with the eccentric hole in the first disc.

The discs 4 are longitudinally spaced along the length of the bars so that separating gaps T remain between neighboring discs. The length of these gaps is not affected by the relative motion of the two systems of bars.

The relationship of the various elements will be readily understood by referring to FIGS. 2 and 3 which are a side elevation and cross section respectively of the arrangement shown in FIG. 1, excepting that the two pivot pins of the discs are shown in vertical alignment instead of horizontal alignment, that is to say in the position in which the elevational separation of the two systems of bars I and II is a maximum. The arrangement is such that in this extreme position the elevational sections of the two systems of bars still overlap by a small amount D.

FIG. 4 illustrates the movement performed by the disc-shaped crosspieces. At the left hand end of FIG. 4 two discs 4 are shown side by side and their motions are indicated by circles in discontinuous lines. Reference numeral 5 represents the circle of oscillation which determines the stroke of the screen when both systems of bars rotate about a common center of rotation. Alternatively, if system II moves in relation to a stationary system I, then the circle of oscillation will be that indicated by reference numeral 6. The circle traversed by the crosspieces is marked by reference numeral 7. The shaded areas 8 are the areas swept by the crosspieces on the bars irrespectively of whether the two systems move in a circle of oscillation 5 around a common centre or whether one system is stationary and the other moves in relation thereto in a circular path defined by a circle of oscillation 6. If, as in a preferred embodiment of the invention, the crosspieces are longitudinally spaced in such a way that the same swept areas overlap, then the result will be an automatic cleaning action on the sides of the garte bars which will prevent even the most difficult screened material from leaking or sticking to the sides of the bars. As schematically illustrated in FIGURE 1, at least one of the systems of bars is connected to a conventional and suitable moving means, so that there will be movement of the systems I and II relative to each other.

FIG. 5 illustrates another phase in the relative movement of the two systems of bars in which the crosspieces have turned through an angle of approximately 45°.

In this drawing the generation of the swept areas 8' and 8" is more clearly illustrated. The distance T' which defines the mesh along the length of the bars remains constant as the system oscillates in a circular motion defined by circle 5, and the position of the opening does not change. However, when only one system moves, then the position of the opening will change, though the distance T' remains constant. In the latter case the crosspieces move to and fro from left to right and conversely.

FIG. 6, as will be understood without further explanation, shows a number of different embodiments of crosspieces (4', 4", 4''', 4''''), characterised by different outlines which have the effect of continuously varying the gap between consecutive crosspieces as the systems move in relation to each other.

FIG. 7 is a cross section similar to that according to FIG. 3 and illustrates the application of the basic idea of the invention to the purpose of achieving very fine screening effects. In this embodiment the bar elements of the two systems I and II have different heights and the disc-like crosspieces 4 have brushes fitted around their peripheries.

The upper edges of the bar elements of system I support a schematically indicated fine mesh screening fabric 9. In the drawing the pins 3 upon which the crosspieces are mounted are all shown in a position in which they are contained in the same horizontal plane. In course of the circular oscillation, i.e. after rotation through an angle of 90° (when the pins of each disc will be in vertical alignment instead of horizontal alignment), the brushes will sweep the underside of the fabric and clean the same, the angle of sweep depending upon the relative design positions and the flexibility of the brush bristles.

On a smaller scale FIG. 8 shows a number of further embodiments of crosspieces. These are merely illustrative of the vast number of available possibilities and they are not intended to limit the scope of the invention.

The crosspiece according to FIG. 8a is provided with bristles around its periphery and is intended for use in a screen resembling that shown in FIG. 7.

The element in FIG. 8b is of compound construction and consistt of a core of, for example, synthetic plastic (polyamide with useful emergency running properties and an outer part consisting of abrasion-resistant material).

FIG. 8c shows a crosspiece made exclusively of synthetic plastic with laterally projecting bristles. For the sake of clarity and simplicity the position of the pivot pins is not shown in this drawing.

In the embodiment according to FIG. 8d an external ring 13 of non-abrasive material is loosely and freely rotatably mounted on a core 4.

FIG. 8e shows a cylindrical crosspiece of plastic with an internal recess 14 which imparts a greater degree of resilience to the element.

FIG. 8f shows another cylindrical crosspiece in which the pivot pins connecting the crosspieces with the bars are mounted in blind holes 15, an arrangement which is useful preventing the penetration of dust.

Finally, FIG. 8g shows a form of construction which is intended more especially for coarse grain classification. In this embodiment two circular crosspieces 4 are connected to a central constricted web 16. The central part of the crosspiece is thus considerably narrower than its ends, and although the cleaning action of the large diameter ends in cooperation with the bars is the same, the open area of the screen is much larger than that of a screen in which the crosspieces are of solid cylindrical shape. In this embodiment, as shown in the drawing, bristles 17 may be mounted on the thinner central part of the crosspiece to provide an action similar to that described with reference to FIG. 7.

FIG. 9a shows a disc with a slot for the reception of the pivot pins 3, 3', of the two systems, permitting the pins to perform slight compensatory motions in order to even out minor inaccuracies of construction.

In FIG. 9b the pins 3 are so close together that the stroke of the driving engine need be only small. The annular part of the crosspiece is arranged to move freely in relation to the rotating pins.

FIG. 9c shows a form of construction in which the distance between the pivot pins 3 is arranged to be less than the internal diameter of the ring. The pins therefore impart periodical raps to the ring.

In FIG. 9d the usual disc-shaped ring is replaced by a wire ring 18 formed with inward hairpin-like curves for the reception of the pivot pins. The open interior of the ring gives rise to a wide open area. The pins 3 could also be passed through the rings at points outside the inward hair-pin wire loops, as incidated in dotted lines.

FIG. 9a illustrates the simplest form of construction of a ring-shaped member obtained by bending a round or other section wire material into the shape of a simple eyelet or divided ring.

In FIG. 9f the ring-shaped member is braced by a stay 20 permitting the ring to be entrained at given intervals by the pins 3.

FIG. 9g illustrates the provision of several entraining abutments 21 inside a ring.

FIG. 9h illustrates the possibility of providing the ring with internal gear teeth on a pitch circle which exceeds the circle of oscillation traversed by the pins 3, 3'. In this arrangement the rapping effect on the ring is particularly effective.

In FIG. 10 a circular disc is provided with additional holes.

FIG. 11 shows a form of construction with additional recessed lobes which can also be used for classification.

FIG. 12 illustrates two of the basic possibilities, which have been described above, of replacing crosspieces of circular section by crosspieces 23, 23' of say rectangular section which in the course of their circular motion cause the openings between the bars to open and close in periodic succession.

Finally, FIG. 13 illustrates a possibility of continuously cleaning the peripheries of cylindrical crosspieces by providing the bar system with a scraper bar 24 which in certain angular ranges sweeps across the surfaces of the cylindrical elements at the bottom.

It will be readily understood that in addition to the embodiments which have above been described the self-cleaning screen according to the invention is capable of numerous other modifications within the scope of the idea upon which the invention is based.

I claim:

1. A sifting screen comprising at least two adjacent longitudinally extending parallel spaced bars; a plurality of crosspieces disposed between opposing surfaces of said bars, said crosspieces arranged symmetrically between adjacent bars and extending substantially along the length of said bars, said crosspieces having opposing side walls slightly spaced from the respective adjacent surfaces of said bars and having end walls spaced from the end walls of adjacent ones of said crosspieces; first pivot pin means laterally extending from one of the side walls of said crosspieces to one of said bars for eccentrically and rotatably connecting said crosspieces to one of said bars; second pivot pin means laterally extending from the other of the side walls of said crosspieces to the other of said bars for eccentrically rotatably connecting said crosspieces to said other of said bars, said second pivot pin means being in offset spaced relation with respect to said first pivot pin means, the distance between the respective ones of said pivot pin means of consecutive ones of said crosspieces not exceeding the diameter of said crosspieces plus twice the eccentricity of the respective ones of said pivot pin means; and means to subject at least one of said bars to rotary movement relative to the other of said bars, whereby when relative rotary movement is imparted to said bars, said crosspieces are caused to sweep through a substantial zone of the space between the ends walls of adjacent ones of said crosspieces, the spacing between said first and second pivot pin means of the respective crosspieces determining the eccentric movement of said crosspieces and said bars.

2. A sifting screen according to claim 1, in which said crosspieces are in the form of cylindrical discs.

3. A sifting screen according to claim 2, in which the distance of the said pins of said crosspieces from the top edge of said bars is less than the sum of the radius of said crosspiece and the eccentricity thereof.

4. A sifting screen according to claim 2 including a mesh screen element disposed in slightly spaced relation above the top edges of said bars, the periphery of said cylindrical crosspieces being provided with bristle-like elements to periodically contact said screen element.

5. A sifting screen according to claim 1, in which said crosspieces are compound members consisting of an inner core made of bearing materials and a ring of non-abrasive material embracing the core.

6. A sifting screen according to claim 5, in which the internal diameter of said ring exceeds the diameter of the circle of oscillation around which said pins rotate.

7. A sifting screen according to claim 1 wherein said crosspieces are in the form of a ring in which the internal diameter of said ring is provided with inwardly extending teeth-like members.

8. A sifting screen according to claim 1 wherein said crosspieces are in the form of a ring in which the interior of said ring is divided by inwardly extending entraining projections.

9. A sifting screen comprising two relatively movable frame systems, each of said systems including a plurality of longitudinally extending parallel spaced bars, the bars of one of said systems being movably interdigitated between the bars of the other of said systems; a plurality of crosspieces disposed between opposing surfaces of the bars of said systems, said crosspieces arranged symmetrically between adjacent one of said bars and extending substantially along the length of said bars, said crosspieces having opposing side walls slightly spaced from the respective adjacent surfaces of the bars of said systems and having end walls spaced from the end walls of adjacent ones of said crosspieces; first pivot pin means laterally extending from one of the side walls of said crosspieces to the bars of one of said systems for eccentrically and rotatably connecting said crosspieces to the bars of one of said systems; second pivot pin means laterally extending from the other of the side walls of said crosspieces to the bars of the other of said systems for eccentrically and rotatably connecting said crosspieces to the bars of the other of said systems, said second pivot pin means being in offset spaced relatiton with respect to said first pivot pin means, the distance between the respective ones of said pivot pin means of consecutive ones of said crosspieces not exceeding the diameter of said crosspieces plus twice the eccentricity of the respective ones of said pivot pin means and means to subject one of said frame systems to rotary movement relative to the other of said frame systems, whereby when relative rotary movement is imparted to said systems, said crosspieces are caused to sweep through a substantial zone of the space between the end walls of adjacent ones of said crosspieces, the spacing between said first and second pivot pin means of the respective crosspieces determining the eccentric movement of said crosspieces and said bars.

References Cited by the Examiner

UNITED STATES PATENTS 97,630   12/1869   Green _____ 209—396

FOREIGN PATENTS 711,608   6/1931   France.
603,045   9/1934   Germany.
88,615   2/1937   Sweden.

HARRY B. THORNTON, *Primary Examiner.*

HERBERT L. MARTIN, *Examiner.*

R. HALPER, *Assistant Examiner.*